United States Patent [19]

Denneau et al.

[11] Patent Number: 5,414,832
[45] Date of Patent: May 9, 1995

[54] TUNABLE SYNCHRONOUS ELECTRONIC COMMUNICATION APPARATUS

[75] Inventors: Monty M. Denneau, Brewster; Bruce D. Gavril, Chappaqua; Peter H. Hochschild, New York, all of N.Y.; Craig B. Stunkel, Bethel, Conn.

[73] Assignee: International Business Machines Corporation, Armonk, N.Y.

[21] Appl. No.: 991,930

[22] Filed: Dec. 17, 1992

[51] Int. Cl.$^6$ .............................................. G06F 1/04
[52] U.S. Cl. ..................................................... 395/550
[58] Field of Search ................. 395/550; 364/DIG. 1, 364/DIG. 2

[56] References Cited

U.S. PATENT DOCUMENTS

| | | | |
|---|---|---|---|
| 3,651,481 | 3/1972 | Evans et al. | 364/DIG. 2 |
| 4,063,308 | 12/1977 | Collins et al. | 364/DIG. 1 |
| 4,330,846 | 5/1982 | Colles et al. | 364/DIG. 2 |
| 4,426,685 | 1/1984 | Lorentzen | 364/DIG. 2 |
| 4,546,269 | 10/1985 | Johnson | 364/DIG. 2 |
| 4,562,573 | 12/1985 | Murano et al. | 370/85 |
| 4,700,347 | 10/1987 | Rettberg et al. | 371/1 |
| 4,714,924 | 12/1987 | Ketzler | 340/825 |
| 4,881,165 | 11/1989 | Sager et al. | 364/DIG. 1 |
| 4,931,986 | 6/1990 | Daniel et al. | 364/DIG. 2 |
| 4,984,255 | 1/1991 | Davis et al. | 375/106 |
| 5,118,975 | 6/1992 | Hillis et al. | 307/602 |
| 5,140,688 | 8/1992 | White et al. | 364/DIG. 2 |

OTHER PUBLICATIONS

Noakes, M., et al. "System Design of the J–Machine." *Proceedings of the Sixth MIT Conference on Advanced Research in VLSI*, Cambridge, Mass., Apr. 2, 1990, pp. 179–194.
Rettberg, R. D., et al. "The Monarch Parallel Processor Hardware Design." *IEEE Computer*, vol. 23, No. 4, Apr. 1990, pp. 18–30.

*Primary Examiner*—Thomas M. Heckler
*Attorney, Agent, or Firm*—Marc D. Schechter; Robert P. Tassinari, Jr.

[57] ABSTRACT

A synchronous communication apparatus can be tuned to ensure reliable reception of signals propagating along transmission lines. The apparatus can be used as a communication port in a high frequency, highly connected synchronous network in which all ports can be tuned by a single, remote network control device. A local data source outputs a data signal during each of a series of local clock periods. A local source delay circuit receives input data signals from the local data source, and outputs output signals delayed by all amount $(mT + \Delta pT)$ relative to corresponding input data signals, where m is a positive integer or zero, and where $0 < \Delta p < 1$. The amount of the delay is dependent on the value of a source delay select signal. A local data receiver receives data signals from a local receiver delay circuit. The amount of delay of the local receiver delay circuit is also selectable. A remote data signal reflection circuit has an input connected to the output of the local source delay circuit by way of a first transmission line. The remote data signal reflection circuit has an output connected to the input of the local receiver delay circuit by way of a second transmission line. The remote data signal reflection circuit outputs an acknowledge signal having a value which is dependent on the value of a corresponding data signal received by the remote data signal reflection circuit from the local data source.

11 Claims, 4 Drawing Sheets

TUNABLE SYNCHRONOUS ELECTRONIC COMMUNICATION APPARATUS

BACKGROUND OF THE INVENTION

The invention relates to synchronous communication networks, such as for communication between computer processing nodes.

Parallel computer processor systems may contain large numbers of processing nodes. Each processing node may be a processor, a memory element, an input/output server, or some other computer processor or peripheral. The processing nodes in parallel computer processor systems are commonly connected by a network of switch nodes that transfer information between the processing nodes.

In parallel computer processor systems, it is desirable to have a high degree of connectivity. The greater the connectivity, the fewer the number of communication hops required to pass information through the network, potentially reducing the communication latency. Increasing connectivity also increases the bisectional bandwidth (the maximum bandwidth achieved when half of the processing nodes are attempting to send information to the other half of the processing nodes), and the improves the ability of the network to perform in some degraded fashion in the presence of faulty network components.

In a point-to-point interconnection network, each network device contains at least one communication port. Each communication port contains, at least in part, logic circuits for transmitting data to or for receiving data from any other compatible communication port via one or more communication links or transmission lines.

In a synchronous network, all of the communication ports are controlled by a common oscillator called the system clock. A synchronous, simplex communication stage contains a source communication port for transmitting a plurality of data signals from the port in synchronism with a first image of the system clock, contains a receiving port for receiving data signals in synchronism with a different image of the system clock, and contains a transmission line for propagating data signals over a fixed distance between the two ports.

Synchronous networks are attractive for reducing communication latency between connected network devices. Asynchronous communication networks use communication protocols which may require multiple machine cycles of processing of input data signals before the signal information call be used reliably, or they may operate at only a fraction of the speed of the communicating network devices.

In synchronous networks, each communication port is driven by a distinct image of the system clock. If information sent from one communication port to another arrives inside the critical setup or hold regions of the register logic of the receiving port, the information may be incorrectly latched. The mechanism for ensuring that data signals never change in the setup and hold regions is referred to as tuning.

In networks that contain exclusively short links less than one clock cycle in electrical distance, tuning may be achieved by providing a mechanism for ensuring that each network device operates with approximately the same image of the system clock. However, in constructing high frequency, highly connected networks, links might not always be less than one clock cycle in electrical distance. Hence, operating each network device from the same image of the system clock does not guarantee that signals will not change during the setup or hold times at the receiving port.

In one approach to tuning a high frequency, highly connected synchronous network, the wires comprising the simplex links can be cut to lengths which ensure proper signal timing. However, any change in system clock frequency or system clock phase may necessitate further adjustments. Moreover, clipping wires is labor intensive, error prone, and inflexible.

In another approach to tuning a synchronous network, a clocking signal is added to the data, effectively treating the data as asynchronous. This method forces the receiving port to perform a multiple cycle synchronization operation on each incoming signal, thereby increasing communication latency.

U.S. Pat. No. 4,700,347 describes yet another approach to tuning a synchronous communication network. In this approach, each input data signal is delayed in the receiving port by a plurality of monotonically increasing delay circuits. The output of each delay circuit is latched in a testing flip-flop clocked by the remote image of the system clock in the receiving port. The latched signal values in pairs of successive testing flip-flops are then compared to detect discrepancies in the latched input signal. A discrepancy indicates that the associated pair of delay circuits delay a transition in the input data signal to opposite sides of the setup and hold regions in the testing flip-flops. The delay circuits associated with these "disagreeing" flip-flops therefore produce delayed input signals which change value near the setup and hold regions of the register logic of the receiving port, and should be avoided. Instead, the input data signal is obtained from a flip-flop associated with a delay circuit which delays the input signal approximately one-half cycle before or after the delay circuits associated with the "disagreeing" flip-flops. This approach can be used continuously or at regular intervals to maintain proper synchronization.

To separately determine the optimal delay circuits for each of a plurality of input signals, the approach described in U.S. Pat. No. 4,700,347 requires a plurality of separate delay circuits dedicated to each input of each receiving port. Furthermore, because all signal delay adjustment is performed by the receiver, the delay selection mechanism must either (a) be implemented entirely in hardware, or (b) be controlled by software or program logic contained entirely within the receiving device. Consequently, the transmitting device cannot communicate with the receiving device unless the tuning circuits and the tuning process in the receiving device work properly.

SUMMARY OF THE INVENTION

It is an object of the invention to provide an electronic communication port for a high frequency, highly connected synchronous communication network of communication ports, in which all network ports can be tuned by a single, remote network control device to ensure reliable signal reception throughout the network.

It is another object of the invention to provide a synchronous communication apparatus which can be tuned to ensure reliable reception of signals propagating along transmission lines which are greater than one clock cycle in electrical distance.

An electronic communication apparatus according to the invention comprises a local clock having a clock period T. The local clock generates a local clock signal each clock period. A local data source has an output for outputting a data signal during each of a series of local clock periods. A local source delay circuit has a data input connected to the output of the local data source for receiving input data signals from the local data source. The local source delay circuit has a data output for outputting an output data signal corresponding to each input data signal. Each output data signal is delayed by an amount $(mT+\Delta pT)$ relative to its corresponding input data signal, where m is a positive integer or zero, and where $0 < \Delta p < 1$.

Preferably, the local source delay circuit has a select input for receiving a source delay select signal having a value. The delay $(mT+\Delta pT)$ has a value which is dependent on the value of the source delay select signal.

The electronic communication apparatus according to the invention may further comprise a local data receiver having an input for receiving a data signal during each of a series of local clock periods. A local receiver delay circuit has a data input for receiving input data signals. The local receiver delay circuit has a data output connected to the input of the local data receiver for outputting an output data signal corresponding to each input data signal. Each output data signal is delayed by an amount $(nT+\Delta qT)$ relative to its corresponding input data signal, where n is a positive integer or zero, and where $0 < \Delta q < 1$.

Preferably, the local receiver delay circuit has a select input for receiving a receiver delay select signal having a value. The delay $(nT+\Delta qT)$ has a value which is dependent on the value of the receiver delay select signal.

In a further aspect of the invention, the electronic communication apparatus may also comprise a remote clock having a remote clock period T equal to the local clock period. The remote clock generates a remote clock signal each remote clock period. The remote clock signal has a clock phase in the range of zero to $2\pi$ radians relative to the local clock signal. A first transmission line has an input connected to the output of the local source delay circuit. The first transmission line propagates data signals from the input of the first transmission line to an output of the first transmission line. A second transmission line has an output connected to the input of the local receiver delay circuit. The second transmission line propagates data signals from an input of the second transmission line to the output of the second transmission line.

The first and second transmission lines each have electrical lengths greater than one clock cycle T in electrical distance.

A remote data signal reflection circuit has an input connected to the output of the first transmission line for receiving a data signal during each of a series of remote clock periods. The remote data signal reflection circuit has an output connected to the input of the second transmission line for outputting an acknowledge signal during each remote clock period. Each acknowledge signal has a value which is dependent on the value of a corresponding data signal received by the remote data signal reflection circuit during the same remote clock period or a prior remote clock period.

The electronic communication apparatus according to the invention may further comprise a counter circuit for counting the number of local clock periods in an interval starting with the local period in which a data signal is output from the local data source, and ending with the local clock period in which the corresponding acknowledge signal is received by the local data receiver.

The electronic communication apparatus according to the invention, further comprises, in part, a local transmit register. The local transmit register has a data input connected to the output of the local data source, has a data output connected to the input of the local source delay circuit, and has a clock input for receiving the local clock signal.

The local data receiver may comprise, in part, a local receive register. The local receive register has a clock input for receiving the local clock signal.

The local source delay circuit of the electronic communication apparatus according to the invention may comprise a local clock delay circuit for generating two or more delayed local clock signals. Each delayed local clock signal has a period T equal to the local clock period. Each delayed local clock signal has a clock phase in the range of zero to $2\pi$ radians relative to the local clock signal. At least two delayed local clock signals have different clock phases.

The local source delay circuit also includes a first source multiplexor having two or more clock inputs. Each clock input receives one delayed local clock signal from the local clock delay circuit. The first source multiplexor has an output for outputting a delayed local clock signal, and has a select input for receiving a first select signal having a value. The first source multiplexor switchably connects one clock input of the first source multiplexor to the output of the first source multiplexor in dependence on the value of the first select signal.

A first local source delay register has a clock input connected to the output of the first source multiplexor. The first local source delay register also has a data input connected to the output of the local data source, and has a data output.

The local source delay circuit further includes a second source multiplexor having two or more clock inputs. Each clock input receives one delayed local clock signal from the local clock delay circuit. The second source multiplexor has an output for outputting a delayed local clock signal, and has a select input for receiving a second select signal having a value. The second source multiplexor switchably connects one clock input of the second source multiplexor to the output of the second source multiplexor in dependence on the value of the second select signal.

A second local source delay register has a clock input connected to the output of the second source multiplexor. The second local source delay register has a data input connected to the output of the first local source delay register, and has a data output connected to the input of the first transmission line.

In the electronic communication apparatus according to the present invention, the local receiver delay circuit may comprise a first receiver multiplexor having two or more clock inputs. Each clock input receives one delayed local clock signal from the local clock delay circuit. The first receiver multiplexor has an output for outputting a delayed local clock signal, and has a select input for receiving a third select signal having a value. The first receiver multiplexor switchably connects one clock input of the first receiver multiplexor to the output of the first receiver multiplexor in dependence on the value of the third select signal. A first local receiver delay register has a clock input connected to the output of the first receiver multiplexor. The first local receiver delay register has a data input connected to the output of the second transmission line, and has a data output.

The local receiver delay circuit further comprises a second receiver multiplexor having two or more clock inputs. Each clock input receives one delayed local clock signal from the local clock delay circuit. The second receiver multiplexor has an output for outputting a delayed local clock signal, and has a select input for receiving a fourth select signal having a value. The second receiver multiplexor switchably connects one clock input of the second receiver multiplexor to the output of the second receiver multiplexor in dependence on the value of the fourth select signal. A second local receiver delay register has a clock input connected to the output of the second receiver multiplexor. The second local receiver delay register has a data input connected to the output of the first local receiver delay register, and has a data output connected to the input of the local data receiver.

Preferably, the first transmission line comprises a plurality of individual transmission lines having outputs. Each individual transmission line carries a series of binary digit signals having values.

In one embodiment of the invention, the remote data signal reflection circuit comprises a logical "OR" circuit having a plurality of inputs connected to the outputs of the individual transmission lines of the first transmission line for receiving a plurality of binary digit signals during each of a series of remote clock periods. Each input is connected to an output of one individual transmission line of the first transmission line. The logical "OR" circuit has an output connected to the input of the second transmission line for outputting an acknowledge signal during each remote clock period. Each acknowledge signal has a value which is a logical "OR" of the values of the binary digit signals at the inputs of the logical "OR" circuit during the same remote clock period or a prior remote clock period.

An electronic communication apparatus according to the present invention is advantageous because it can be used as a communication port in a high frequency, highly connected synchronous network of communication ports in which all ports can be tuned by a single, remote network control device to ensure reliable reception of signals from transmission lines.

The synchronous communication apparatus according to the present invention is also advantageous because it can be tuned to ensure reliable reception of signals propagating along transmission lines which are greater than one clock cycle in electrical distance.

DESCRIPTION OF THE PREFERRED EMBODIMENTS

Figure 1:
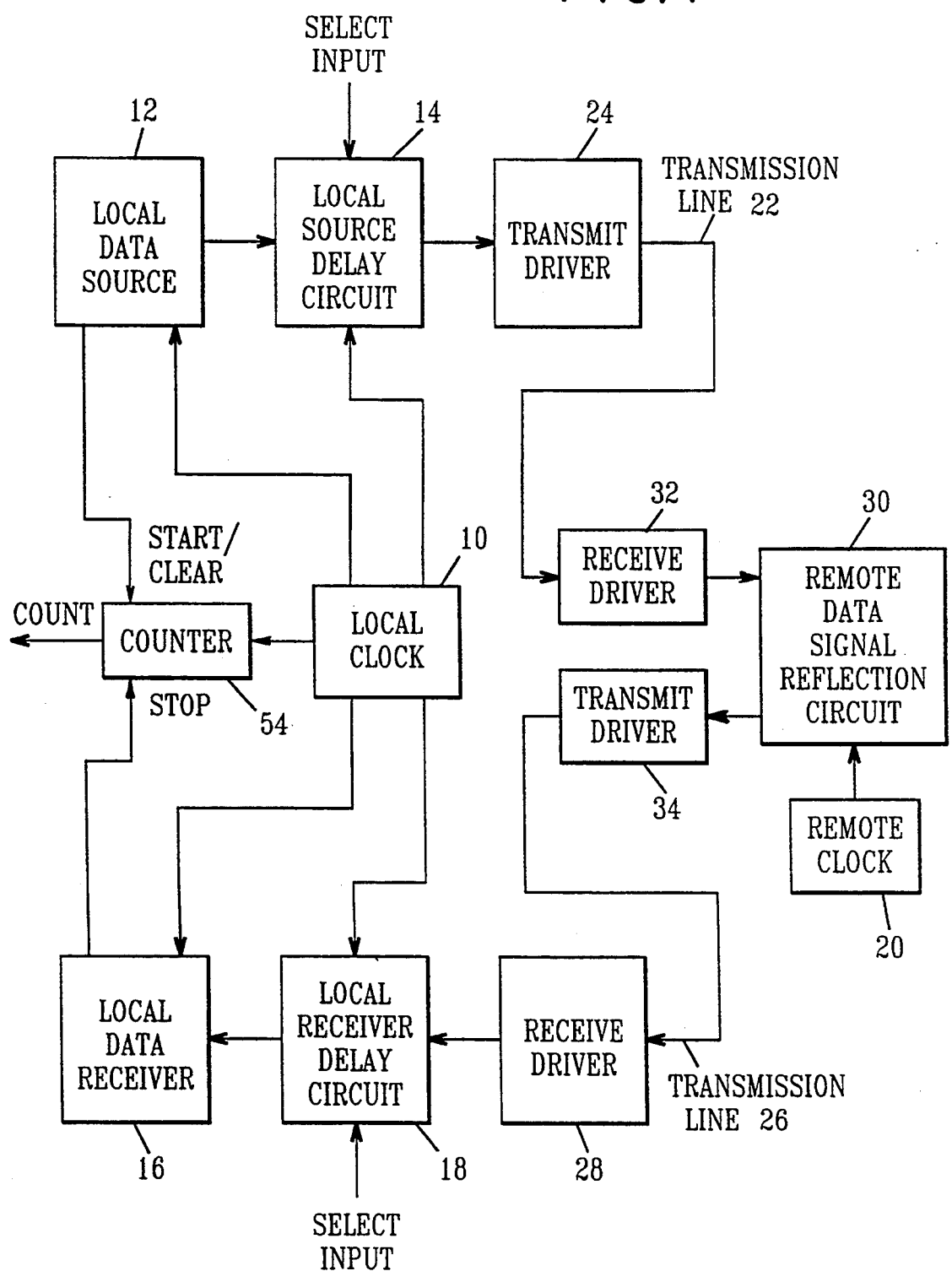
FIG. 1 is a block diagram of an example of an electronic communication apparatus according to the invention.

FIG. 1 is a block diagram of an example of an electronic communication apparatus according to the present invention. The electronic communication apparatus comprises a local clock 10 having a clock period T. The local clock 10 generates a local clock signal each local clock period.

The electronic communication apparatus further comprises a local data source 12 having an output for outputting a data signal during each of a series of local clock periods. Each data signal may comprise one or more digit signals. Each digit is preferably a binary digit. For example, each data signal may contain eight binary digit signals representing information, and one binary digit signal (a "tag" bit) representing the type of information. For example, when the tag bit has a value of "0" the data signal may represent control information. When the tag bit has a value of "1", the data signal may represent message information. The data source may be, for example, a static random access memory and memory controller. Alternatively, the data source may be any known adaptor device for interfacing between a computer processor and the communication system. In another alternative, the data source may be, for example, any known switching device, such as a crossbar switch.

The electronic communication apparatus further comprises a local source delay circuit 14. Local source delay circuit 14 has a data input connected to the output of the local data source 12 for receiving input data signals from the local data source 12. The local source delay circuit 14 has a data output for outputting an output data signal corresponding to each input data signal. Each output data signal is delayed by an amount $(mT + \Delta pT)$ relative to its corresponding input data signal, where m is a positive integer or zero, and where $0 < \Delta p < 1$.

The local source delay circuit 14 has a select input for receiving a source delay select signal having a value. The delay $(mT + \Delta pT)$ has a value which is dependent upon the value of the source delay select signal.

The electronic communication apparatus also contains a local data receiver 16 having an input for receiving a data signal during each of a series of local clock periods. The local data receiver may comprise, in part, a local receive register.

The data signal provided to the input of the local data receiver 16 may comprise one or more binary digit signals. In an embodiment of the invention, the data signal input into the local data receiver 16 is a single data flow control bit called a "token".

A local receiver delay circuit 18 has a data input for receiving input data signals. The local receiver delay circuit 18 has a data output connected to the input of the local data receiver 16 for outputting an output data signal corresponding to each input data signal. Each output data signal is delayed by an amount $(nT + \Delta qT)$ relative to its corresponding input data signal, where n is a positive integer or zero, and where $0 < \Delta q < 1$. The local receiver delay circuit 18 has a select input for receiving a receiver delay select signal having a value. The delay $(nT + \Delta qT)$ has a value which is dependent on the value of the receiver delay select signal.

Still referring to FIG. 1, the electronic communication apparatus includes a remote clock 20 having a remote clock period T equal to the local clock period.

The remote clock 20 generates a remote clock signal each remote clock period. The remote clock signal has a clock phase in the range of zero to $2\pi$ radians relative to the local clock signal.

A first transmission line 22 has an input connected to the output of the local source delay circuit 14. The first transmission line 22 propagates data signals from the input of the first transmission line to an output of the first transmission line.

As shown in FIG. 1, the input of the first transmission line 22 is connected to the output of the local source delay circuit 14 by way of a transmit driver 24. For a data signal comprising nine binary digit signals, the transmit driver 24 comprises nine driver circuits. Transmit driver 24 provides electric current amplification and impedance matching.

A second transmission line 26 has an output connected to the input of the local receiver delay circuit 18. The second transmission line 26 propagates data signals from an input of the second transmission line to the output of the second transmission line. As shown in FIG. 1, the output of second transmission line 26 is connected to the input of the local receiver delay circuit 18 by way of receive driver 28. For data signals containing only one binary digit signal, the receiver driver 28 contains only one driver circuit. Receive driver 28 provides electric current amplification and impedance matching.

The first and second transmission lines 22 and 26 each have electrical lengths greater than one clock cycle T in electrical distance.

A remote data signal reflection circuit 30 has an input connected to the output of the first transmission line 22 for receiving a data signal during each of a series of remote clock periods. The remote data signal reflection circuit 30 has an output connected to the input of the second transmission line 26 for outputting an acknowledge signal during each remote clock period. Each acknowledge signal has a value which is dependent on the value of a corresponding data signal received by the remote data signal reflection circuit 30 during the same remote clock period or a prior remote clock period.

As shown in FIG. 1, the input of the remote data signal reflection circuit 30 is connected to the output of the first transmission line 22 by way of a receive driver 32. In this example, each data signal on transmission line 22 consists of nine binary digit signals. Therefore, the receive driver 32 contains nine driver circuits. Also shown in FIG. 1, the output of the remote data signal reflection circuit 30 is connected to the input of the second transmission line 26 by way of transmit driver 34. In this example, the acknowledge signal output by the remote data signal reflection circuit 30 consists of one binary digit signal. Therefore, the transmit driver 34 contains one driver circuit.

Figure 2:
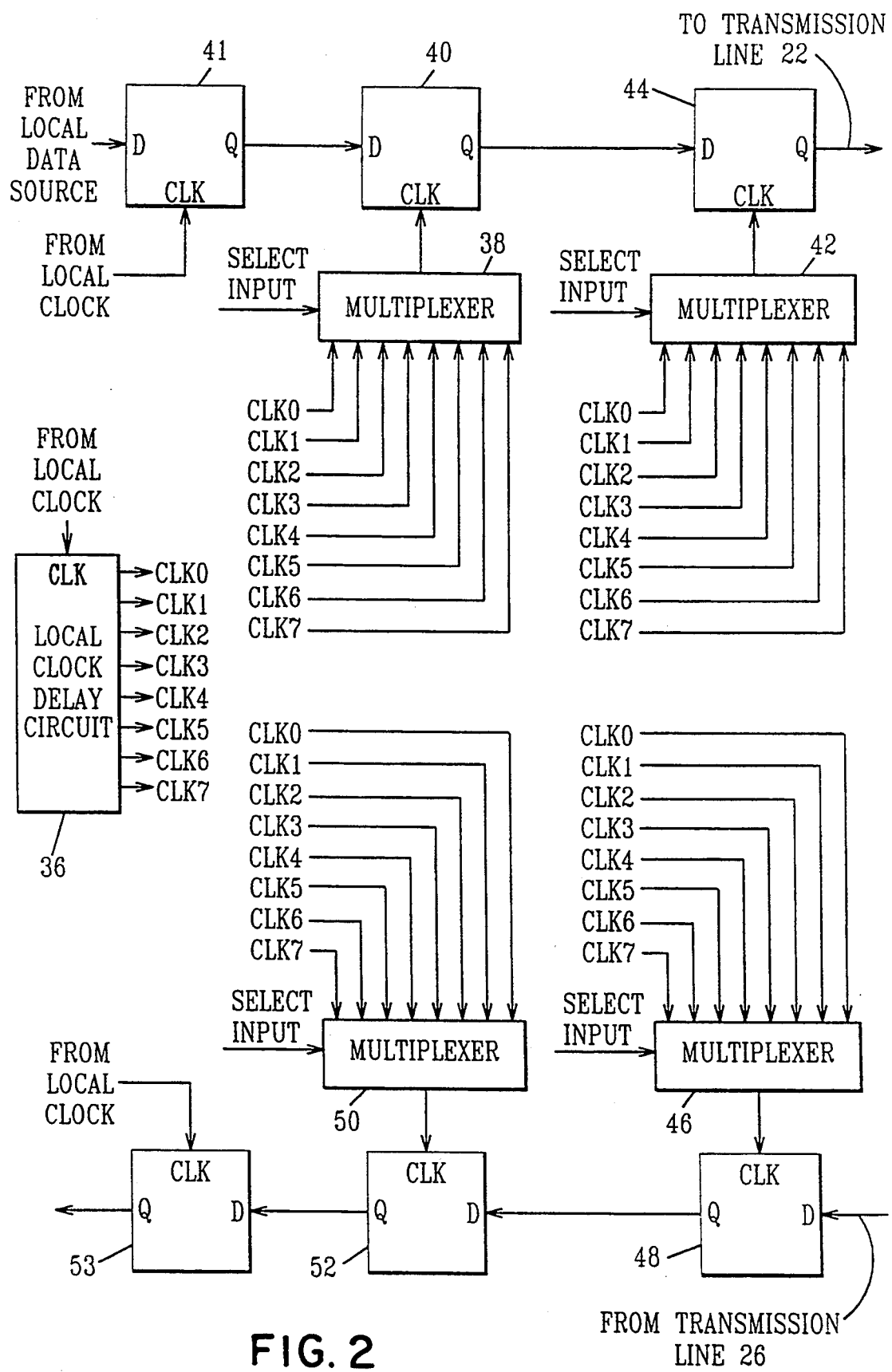
FIG. 2 is a block diagram of an example of a local source delay circuit and a local receiver delay circuit for the electronic communication apparatus of FIG. 1.

FIG. 2 is a block diagram of an example of a local source delay circuit and a local receiver delay circuit for the electronic communication apparatus shown in FIG. 1. The local source delay circuit comprises a local clock delay circuit 36 for generating two or more delayed local clock signals. In FIG. 2, the local clock delay circuit 36 generates eight delayed local clock signals designated as CLK0 through CLK7. Each delayed local clock signal has a period T equal to the local clock period. Each delayed local clock signal has a clock phase in the range of zero to $2\pi$ radians relative to the local clock signal. At least two delayed local clock signals have different clock phases.

Figure 3:
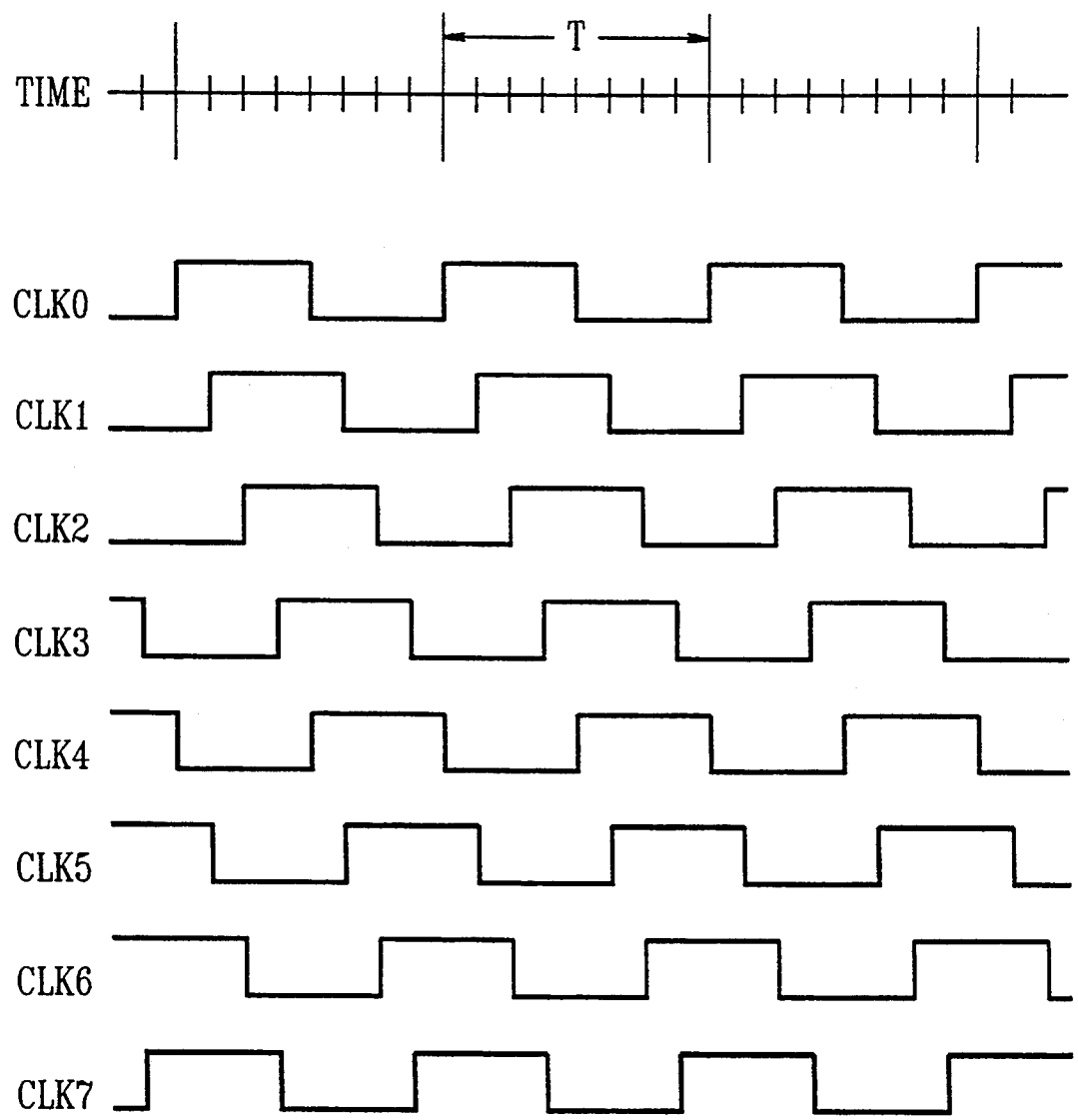
FIG. 3 shows an example of delayed clock signals produced by the local clock delay circuit of FIG. 2.

FIG. 3 shows an example of delayed local clock signals produced by the local clock delay circuit 36 of FIG. 2. In this example, local clock delay circuit 36 generates eight delayed local clock signals CLK0 through CLK7. Each delayed local clock signal has a period T equal to the local clock period. Each delayed local clock signal has a clock phase of $kT/8$ where k is all integer from zero to seven.

The local clock delay circuit 36 may be an offset clock generator, such as part number ECL-100K-LDM-20 available from Engineered Components Company. This offset clock generator provides constant offsets (signal delays) in the range of 2.5 to 20 nanoseconds, in steps of 2.5 nanoseconds.

The local source delay circuit 14 further includes a first source multiplexor 38 having two or more clock inputs. Each clock input receives one delayed local clock signal from the local clock delay circuit 36. In this example, the first source multiplexor 38 has eight clock inputs for receiving the eight delayed local clock signals from the local clock delay circuit 36. The first source multiplexor 38 has an output for outputting the delayed local clock signal, and has a select input for receiving a first select signal having a value. The first source multiplexor 38 switchably connects one clock input of the first source multiplexor to the output of the first source multiplexor in dependence on the value of the first select signal.

The local source delay circuit 14 further comprises a first local source delay register 40 having a clock input connected to the output of the first source multiplexor 38. The first local source delay register 40 also has a data input connected to the output of the local data source 12 (by way of a local transmit register 41), and has a data output. The first local source delay register 40 may contain, for example, one or more D-type flip-flops. Since the data signal from the local data source 12 in this example consists of nine binary digit signals, the first local source delay register 40 contains nine D-type flip-flops.

The local transmit register 41 has a data input connected to the output of the local data source 12, and has a data output connected to the input of the first local source delay register 40 of the local source delay circuit 14. The local transmit register 41 also has a clock input for receiving the local clock signal from local clock 10. Consequently, local transmit register 41 synchronizes the data signal with local clock 10.

The local source delay circuit 14 further contains a second source multiplexor 42 and a second local source delay register 44. The second source multiplexor 42 has two or more clock inputs. Each clock input receives one delayed local clock signal from the local clock delay circuit 36. In this example, the second source multiplexor 42 has eight clock inputs for receiving the eight delayed local clock signals from the local clock delay circuit 36. The second source multiplexor has an output for outputting a delayed local clock signal, and has a select input for receiving a second select signal having a value. The second source multiplexor 42 switchably connects one clock input of the second source multiplexor to the output of the second source multiplexor in dependence on the value of the second select signal.

The second local source delay register 44 has a clock input connected to the output of the second source multiplexor 42. The second local source delay register 44 has a data input connected to the output of the first local source delay register 40, and has a data output connected to the input of the first transmission line 22. The second local source delay register 44 comprises, in this example, nine D-type flip-flop circuits.

Still referring to FIG. 2, the local receiver delay circuit 18 comprises a first receiver multiplexor 46, a first local receiver delay register 48, a second receiver multiplexor 50, and a second local receiver delay register 52. The first receiver multiplexor 46 has two or more clock inputs. Each clock input receives one delayed local clock signal from the local clock delay circuit 36. In this example, the first receiver multiplexor 46 has eight clock inputs for receiving eight local clock signals. The first receiver multiplexor has an output for outputting a delayed local clock signal, and has a select input for receiving a third select signal having a value. The first receiver multiplexor switchably connects one input of the first receiver multiplexor to the output of the first receiver multiplexor in dependence on the value of the third select signal.

The first local receiver delay register 48 has a clock input connected to the output of the first receiver multiplexor 46. The first local receiver delay register 48 also has a data input connected to the output of the second transmission line 26, and has a data output. In this example, the data signal received from second transmission line 26 comprises one binary digit signal. Therefore, the first local receiver delay register may comprise one D-type flip-flop.

The second receiver multiplexor 50 has two or more clock inputs. Each clock input receives one delayed local clock signal from the local clock delay circuit. In this example, second receiver multiplexor 50 has eight clock inputs for receiving eight delayed local clock signals. The second receiver multiplexor 50 has an output for outputting a delayed local clock signal and has a select input for receiving a fourth select signal having a value. The second receiver multiplexor 50 switchably connects one input of the second receiver multiplexor to the output of the second receiver multiplexor in dependence on the value of the fourth select signal. The second local receiver delay register 52 has a clock input connected to the output of the second receiver multiplexor 50. The second local receiver delay register 52 has a data input connected to the output of the first local receiver delay register 48, and has a data output connected to the input of a local receive register 53 of the local data receiver 16. In this example, the second local receiver delay register 52 and the local receive register 53 may each comprise one D-type flip-flop circuit. Local receive register 53 has a clock input for receiving the local clock signal from local clock 10.

Returning to FIG. 1, the electronic communication apparatus further comprises a counter circuit 54. Counter circuit 54 counts the number of local clock periods in an interval starting with the local clock period in which a data signal is output from the local data source 12, and ending with the local clock period in which the corresponding acknowledge signal is received by the local data receiver 16. Counter circuit 54 has a "START/CLEAR" input for resetting the contents of the counter to zero, and for putting the counter into an "increment" mode in which the count is incremented by one on the occurrence of each local clock signal. The counter circuit 54 also has a "STOP" input for putting the counter into a "hold" mode in which the contents of the counter is held at its last value prior to entering "hold" mode.

Figure 4:
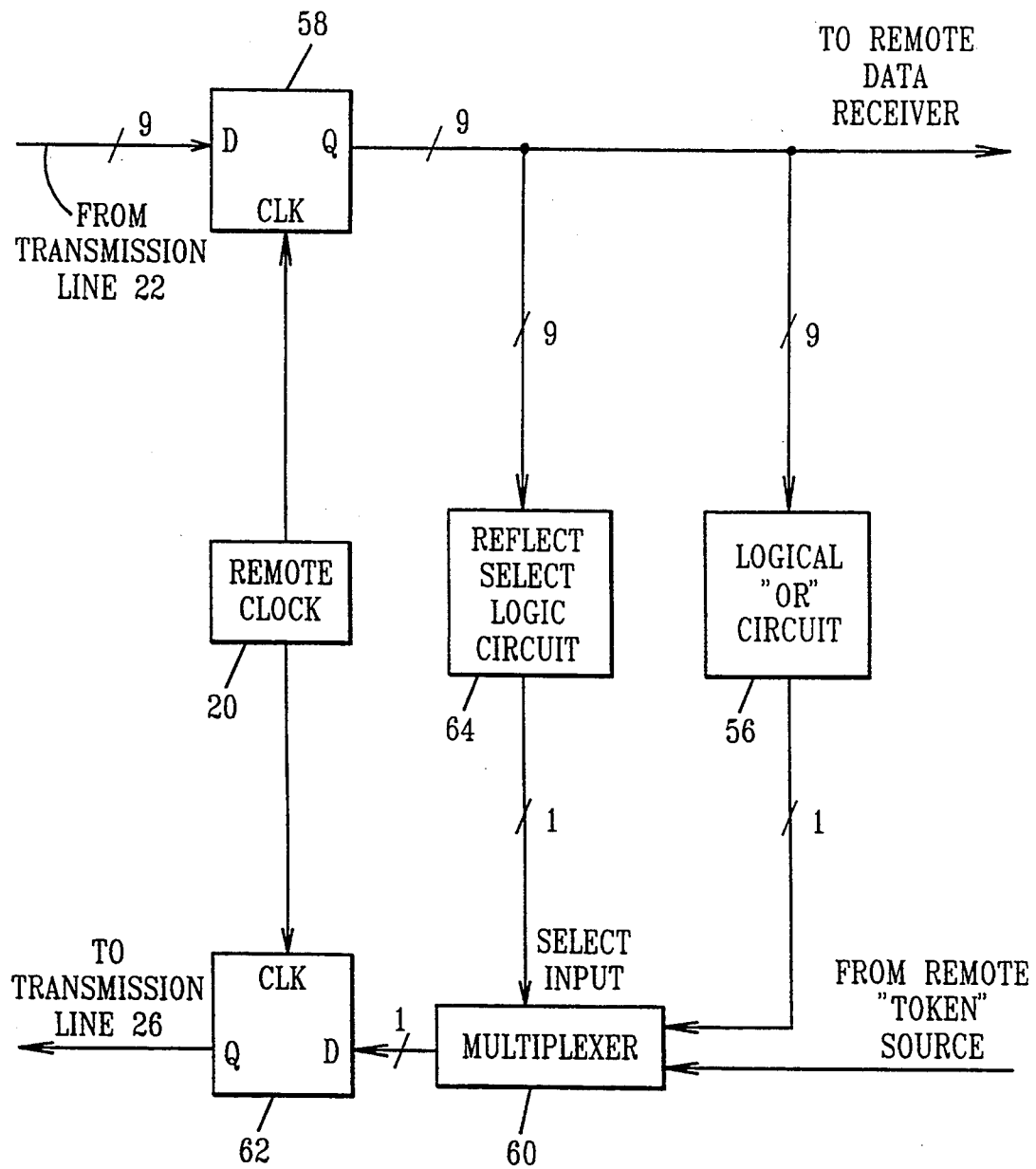
FIG. 4 is a block diagram of an example of a remote data signal reflection circuit of FIG. 1.

FIG. 4 is a block diagram of an example of the remote data signal reflection circuit 30 of FIG. 1. In this example, the first transmission line 22 comprises a plurality of individual transmission lines having outputs. Each individual transmission line carries a series of binary digit signals having values. In this example, the first transmission line 22 comprises nine individual transmission lines.

The remote data signal reflection circuit comprises a logical "OR" circuit 56 having a plurality of inputs connected to the outputs of the individual transmission lines of the first transmission line 22 for receiving a plurality of binary digit signals during each of a series of remote clock periods. Each input of logical "OR" circuit 56 is connected to an output of one individual transmission line of the first transmission line 22. As shown in FIG. 4, each input of logical "OR" circuit 56 is connected to an output of an individual transmission line by way of a remote receive register 58. Remote receive register 58 may comprise nine D-type flip-flop circuits.

The logical "OR" circuit 56 has an output connected to the input of the second transmission line 26 for outputting an acknowledge signal during each remote clock period. Each acknowledge signal has a value which is a logical "OR" of the values of the binary digit signals at the inputs of the logical "OR" circuit during the same remote period or a prior remote clock period.

Still referring to FIG. 4, the output of the logical "OR" circuit 56 is connected to the input of the second transmission line 26 by way of a multiplexor 60 and a remote transmit register 62. The remote transmit register 62 may be a single D-type flip-flop circuit.

The multiplexor 60 switchably connects either the output of logical "OR" circuit 56 or the output from a remote "token" source (not shown) to the input of remote transmit register 62, in dependence on the value of a select signal provided at the select input of multiplexor 60. The select signal for multiplexor 60 is provided by a reflect select logic circuit 64. Reflect select logic circuit 64 receives nine binary digit signals from remote receive register 58. When a reflection code is recognized by reflect select logic circuit 64, a select signal is provided to multiplexor 60 to connect the output of logical "OR" circuit 56 to the input of remote transmit register 62. When an "end-reflection code" is recognized by reflect select logic circuit 64, a select signal is provided to multiplexor 60 for connecting the remote "token" source to the input of remote transmit register 62.

Although not a part of the present invention, the remote "token" source may provide data flow control signals which are sent on transmission line 26 to the local data receiver 16 for regulating the flow of data signals output by local data source 12 onto the transmission line 22. The data signals output from remote receive register 58 may be provided to a remote data receiver (not shown).

The electronic communication apparatus according to the present invention provides a synchronous communication port which can be tuned to ensure reliable reception of signals propagated on transmission lines 22 and 26, regardless of the lengths of the transmission lines. The electronic communication apparatus may be controlled by network service software executing on an intelligent network service processor attached to one port of the communication network. The service software initializes and tunes the entire network in a step-by-step manner, beginning by tuning communication links directly attached to the network service processor, and then by traversing the directly-attached tuned links to tune remotely-attached communication links. In this manner, the tuning process may be entirely controlled by software executing on the network service processor. No network device is required to interpret incoming signals (except for the reflection code described below) until the incoming communication link has been tuned.

The software controlled tuning begins by forcing a directly-attached remote port into a reflection mode by transmitting a reflection code from the local data source 12 over the transmission line 22 to the reflect select logic circuit 64. When reflect select logic circuit 64 receives a reflection code, it outputs a select signal to multiplexer 60 to connect the output of logical "OR" circuit 56 to the input of remote transmit register 62.

The reflection code may be, for example, data=80 (hexadecimal) with tag=0. The end reflection code may be, for example, a sequence of eight bytes (of nine bits per byte):

{106 1B0 100 1F4 1AF 0A1 173} (hexadecimal).

Since the communication link between the local port and the remote port has not yet been tuned, the remote receive register of the remote data signal reflection circuit 30 may not reliably latch the reflection code. Consequently, two or more contiguous reflection codes must be transmitted from the local port to the remote port to ensure proper recognition of the reflection code.

After the remote port is forced into reflection mode, the local source delay circuit 14 and the local receiver delay circuit 18 are set to initial delay values by way of the select inputs thereto. Source delay registers 40 and 44 of local source delay circuit 14 collectively form a single delay mechanism. Similarly, receiver delay registers 48 and 52 of local receiver delay circuit 18 collectively form another single delay mechanism. The purpose of providing two delay registers in each delay circuit is to reliably delay data transmitted from local transmit register 41, and to reliably receive delayed data into local receive register 53 of local data receiver 16.

For example, if the first local source delay register 40 were omitted, and in the case of only a small delay between the second local source delay register 44 and the local transmit register 41, it is possible that the output of local transmit register 41 may be changing during the setup or hold times of the second source delay register 44. As a result, incorrect data may be latched in the second local source delay register 44. By providing the first local source delay register 40 which is controlled by a separately selectable delayed clock, an additional delay can be provided between the second local source delay register 44 and the local transmit register 41 so as to avoid clocking any register when the input signal to that register is changing.

Similarly, when the delay between the first local receiver delay register 48 and the local receive register 53 is small, the second local receiver delay register 52 provides an additional delay so as to avoid clocking any register when the input signal to that register is changing.

After the initial delays in local source delay circuit 14 and local receiver delay circuit 18 are selected, the local data source 12 outputs a nonzero data signal for at least three contiguous cycles of the local clock 10 (three contiguous clock periods T). At the same time, local data source 12 sends a "START/CLEAR" signal to counter 54. In response to the "START/CLEAR" signal, counter 54 is cleared and starts counting local clock periods, beginning with the first local clock period during which the local data source 12 outputs the nonzero data signal.

At least three cycles of data signals are provided by local data source 12 because a single data signal transmitted over transmission line 22 or reflected over transmission line 26 may not be reliably received by the remote receive register 58 of the remote data signal reflection circuit 30, or the local receive register 53 of the local data receiver 16 prior to the completion of tuning.

When the remote data signal reflection circuit 30 receives nonzero data signals transmitted from local data source 12, logical "OR" circuit 56 returns an acknowledge signal over transmission line 26. When the local data receiver 16 detects the acknowledge signal, counter 54 is stopped. The network service software executing on the network service processor stores the count thus obtained from counter 54.

Subsequently, the delay settings of either the local source delay circuit 14 or the local receiver delay circuit 18 are monotonically increased, each time counting the number of cycles starting with the local clock period in which the data signal is output from the local data source 12, and ending with the local clock period in which the corresponding acknowledge signal is received by the local data receiver 16. An increase in the count obtained from counter 54 indicates that the current delay setting and the previous delay setting are on opposite sides of the setup or hold window of the affected receive register, or that at least one of the delay settings is within the setup or hold region. The network service software then completes the tuning of the local source delay circuit 14 or the local receiver delay circuit 18 by selecting a delay setting as far from the current delay setting as possible. For example, the selected delay setting may be one-half cycle away from the current delay setting.

When the tuning is complete, the end reflection code is transmitted from the local data source 12 to the reflect select logic circuit 64 at the remote port, thereby resuming normal operation at the remote port.

The flip-flop circuits contained in the communication apparatus according to the invention may be clocked, for example, by the rising edge of each clock signal. By choosing minimum signal delays between adjacent flip-flop circuits, a potential race-around problem is avoided.

What is claimed is:

1. An electronic communication apparatus comprising:
   a local clock having a clock period T, said local clock generating a local clock signal each local clock period;
   a local data source coupled to the local clock and having an output for outputting a data signal during each of a series of the local clock periods; and
   a local source delay circuit having a data input connected to the output of the local data source for receiving input data signals from the local data source, said local source delay circuit having a data output for outputting an output data signal corresponding to each input data signal, each output data signal being delayed by an amount $(mT + \Delta pT)$ relative to its corresponding input data signal, where m is a positive integer or zero, and where $0<\Delta p<1$; characterized in that:

the local source delay circuit has a select input for receiving a source delay select signal having a value; and the delay $(mT+\Delta p)$ has a value which is dependent on the value of the source delay select signal.

2. An electronic communication apparatus as claimed in 1, further comprising:

a local data receiver coupled to the local clock and having an input for receiving a data signal during each of a series of the local clock periods;

a local receiver delay circuit having a data input for receiving input data signals, said local receiver delay circuit having a data output connected to the input of the local data receiver for outputting an output data signal corresponding to each input data signal, each output data signal being delayed by an amount $(nT+\Delta qT)$ relative to its corresponding input data signal, where n is a positive integer or zero, and where $0<\Delta q<1$.

3. An electronic communication apparatus as claimed in claim 2, characterized in that:

the local receiver delay circuit has a select input for receiving a receiver delay select signal having a value; and the delay $(nT+\Delta qT)$ has a value which is dependent on the value of the receiver delay select signal.

4. An Electronic communication apparatus as claimed in claim 3, further comprising:

a remote clock having a remote clock period T equal to the local clock period, said remote clock generating a remote clock signal each remote clock period, said remote clock signal having a clock phase in the range of zero to $2\pi$ radians relative to the local clock signal;

a first transmission line having an input connected to the output of the local source delay circuit, said first transmission line propagating data signals from the input of the first transmission line to an output of the first transmission line;

a second transmission line having an output connected to the input of the local receiver delay circuit, said second transmission line propagating data signals from an input of the second transmission line to the output of the second transmission line; and a remote data signal reflection circuit having an input connected to the output of the first transmission line for receiving a data signal during each of a series of the remote clock periods, said remote data signal reflection circuit being coupled to the remote clock and having an output connected to the input of the second transmission line for outputting an acknowledge signal during each remote clock period, each data signal having a value and each acknowledge signal having a value which is dependent on the value of a corresponding data signal received by the remote data signal reflection circuit during the same remote clock period or a prior remote clock period.

5. An electronic communication apparatus as claimed in claim 4, further comprising a counter circuit for counting the number of local clock periods in an interval starting with the local clock period in which a data signal is output from the local data source, and ending with the local chock period in which the corresponding acknowledge signal is received by the local data receiver.

6. An electronic communication apparatus as claimed in claim 5, characterized in that the local source delay circuit comprises:

a local clock delay circuit for generating two or more delayed local clock signals, each delayed local clock signal having a period T equal to the local clock period, each delayed local clock signal having a clock phase in the range of zero to $2\pi$ radians relative to the local clock signal, at least two delayed local clock signals having different clock phases;

a first source multiplexer having two or more clock inputs, each clock input receiving one delayed local clock signal from the local clock delay circuit, said first source multiplexer having an output for outputting a delayed local clock signal, and having a select input for receiving a first select signal having a value, said first source multiplexer switchably connecting one clock input of the first source multiplexer to the output of the first source multiplexer in dependence on the value of the first select signal;

a first local source delay register having a clock input connected to the output of the first source multiplexer, having a data input connected to the output of the local data source, and having a data output;

a second source multiplexer having two or more clock inputs, each clock input receiving one delayed local clock signal from the local clock delay circuit, said second source multiplexer having an output for outputting a delayed local clock signal, and having a select input for receiving a second select signal having a value, said second source multiplexer switchably connecting one clock input of the second source multiplexer to the output of the second source multiplexer in dependence on the value of the second select signal;

a second local source delay register having a clock input connected to the output of the second source multiplexer, having a data input connected to the output of the first local source delay register, and having a data output connected to the input of the first transmission line.

7. An electronic communication apparatus as claimed in claim 6, characterized in that the local receiver delay circuit comprises:

a first receiver multiplexer having two or more clock inputs, each clock input receiving one delayed local clock signal from the local clock delay circuit, said first receiver multiplexer having an output for outputting a delayed local clock signal, and having a select input for receiving a third select signal having a value, said first receiver multiplexer switchably connecting one clock input of the first receiver multiplexer to the output of the first receiver multiplexer in dependence on the value of the third select signal;

a first local receiver delay register having a clock input connected to the output of the first receiver multiplexer, having a data input connected to the output of the second transmission line, and having a data output;

a second receiver multiplexer having two or more clock inputs, each clock input receiving one delayed local clock signal from the local clock delay circuit, said second receiver multiplexer having an output for outputting a delayed local clock signal, and having a select input for receiving a fourth select signal having a value, said second receiver multiplexer switchably connecting one clock input of the second receiver multiplexer to the output of the second receiver multiplexer in dependence on the value of the fourth select signal;

a second local receiver delay register having a clock input connected to the output of the second receiver multiplexer, having a data input connected to the output of the first local receiver delay register, and having a data output connected to the input of the local data receiver.

8. An electronic communication apparatus as claimed in claim 5, characterized in that the local data receiver comprises a local receive register having a clock input receiving the local clock signal.

9. An electronic communication apparatus as claimed in claim 5, further comprising a local transmit register having a data input connected to the output of the local data source, having a data output connected to the input of the local source delay circuit, and having a clock input receiving the local clock signal.

10. An electronic communication apparatus as claimed in claim 5, characterized in that:

the first transmission line comprises a plurality of individual transmission lines having outputs, each individual transmission line carrying a series of binary digit signals having values; and the remote data signal reflection circuit comprises a logical "OR" circuit having a plurality of inputs connected to the outputs of the individual transmission lines of the first transmission line for receiving a plurality of binary digit signals during each of a series of remote clock periods, each input being connected to an output of one individual transmission line of the first transmission line, said logical "OR" circuit having an output connected to the input of the second transmission line for outputting an acknowledge signal during each remote clock period, each acknowledge signal having a value which is a logical "OR" of the values of the binary digit signals at the inputs of the logical "OR" circuit during the same remote clock period or a prior remote clock period.

11. An electronic communication apparatus as claimed in claim 4, characterized in that:

the first transmission line has an electrical length greater than one clock cycle in electrical distance; and the second transmission line has an electrical length greater than one clock cycle in electrical distance.

* * * * *